Patented Feb. 28, 1950

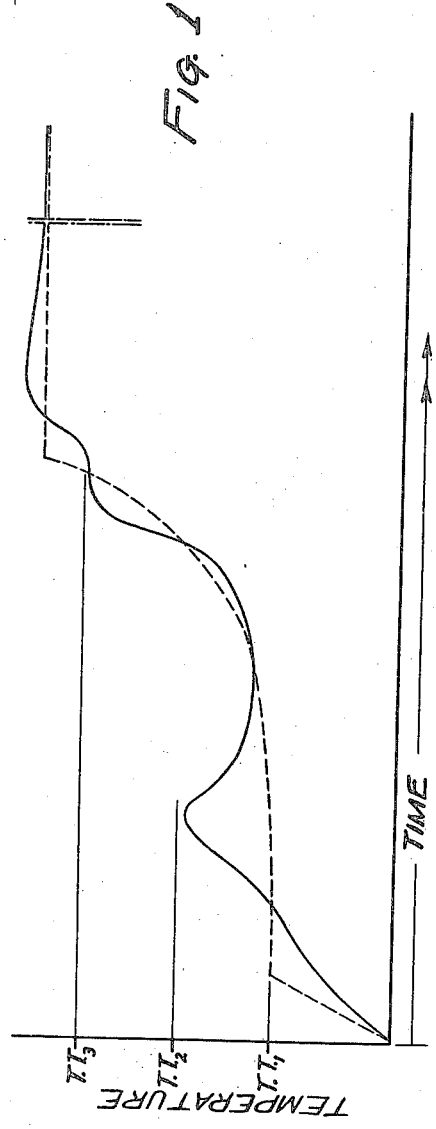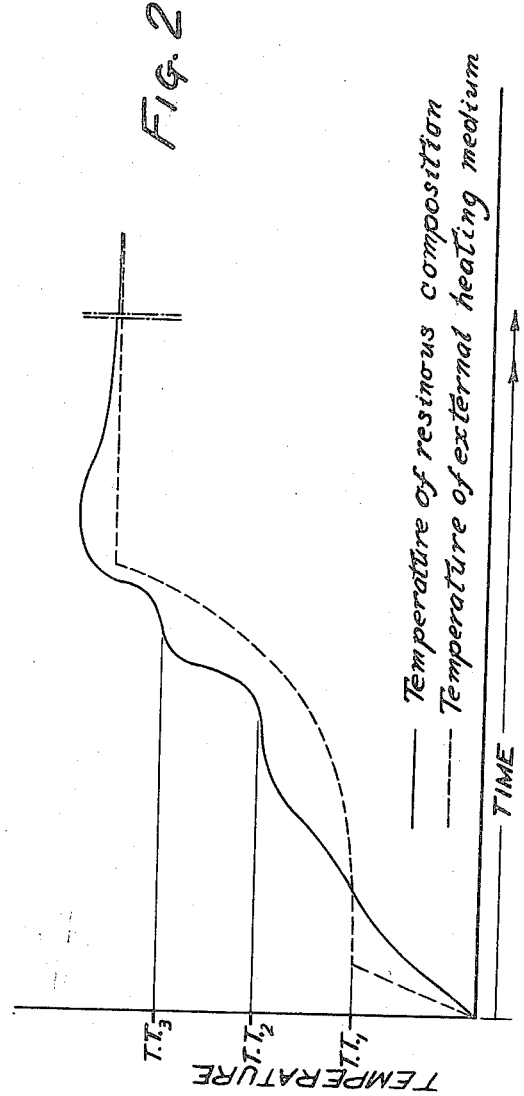

2,499,275

UNITED STATES PATENT OFFICE 2,499,275

PROCESS OF MAKING A FURFURYL ALCOHOL RESINOUS PRODUCT

Purnal L. McWhorter, Odessa, Del., assignor to Haveg Corporation, Newark, Del., a corporation of Delaware Application July 12, 1947, Serial No. 760,636

6 Claims. (Cl. 260—67)

The present invention relates to a novel process of making insoluble, infusible synthetic resinous products from furfuryl alcohol-containing materials selected from the group consisting of furfuryl alcohol and a mixture of furfuryl alcohol and not more than about 15% of furfural. More particularly, the present invention relates to a novel process for the preparation of insoluble, infusible resinous products from heat-convertible resinous compositions prepared from the aforesaid furfuryl alcohol-containing materials, by which the conversion into the insoluble and infusible product may be controlled to produce, either small or large, uniform, substantially fully converted objects with greater safety and in a shorter time than has previously been possible. For convenience, hereinafter, reference will be made merely to furfuryl alcohol and furfuryl alcohol resinous compositions and products, but the discussion is also applicable to the preparation of products from a mixture of furfuryl alcohol and not more than about 15% of furfural.

While resinous products made by the condensation of furfuryl alcohol in the presence of an acid catalyst are known and, when satisfactorily polymerized, these products are characterized by hardness, toughness, and chemical resistance, the commercial use in the past has been limited due to the difficulties encountered in controlling the condensation and polymerization reactions.

The difficulties encountered in the conversion of an initial furfuryl alcohol resin into the final insoluble, infusible state are due to the exothermicity developed and the water formed in the reaction. This conversion is usually brought about by acid and when a strong acid is used in a sufficient amount to give a substantially completely condensed and polymerized resin, the initial resin may not possess a sufficient working life to permit the molding of products therefrom. Care is therefore required in the selection of the catalyst and, even when a catalyst affording a sufficient working life is used, a resinous product possesing satisfactory physical and mechanical properties will not be obtained unless the conversion is brought about by an extended and precisely controlled heat treatment. Thus, if the heating of the product is not controlled, the reaction due to the liberation of uncontrolled exothermic heat will tend to approach explosive violence and the objects will blister or crack, even when the treatment is conducted under high pressure. The difficulties encountered in the curing of the resin increase as the size and more especially the thickness of the article is increased.

Large molded articles have been successfully prepared by mixing phenolic resins in the initial stage and asbestos, or other appropriate fillers, together to form a pasty composition. This composition is then applied to molds or forms of sheet metal, wood or the like by rolling, spinning, tamping or otherwise forming at room temperature. The molds used in this process normally follow only one contour of the article to be manufactured, leaving the other one open. After the composition has been applied at room temperature, the molds are placed in an oven or autoclave and baked to cure or convert the resin, following which the hardened objects are removed and finished by sanding, lacquering, and machining where required. This procedure is described in "The Chemistry of Synthetic Resins" by Carleton Ellis, Reinhold Publishing Company, 1935, pp. 458; 1332, and is very important commercially because it permits the manufacture of large objects without the necessity for expensive molds, hydraulic presses, and other similar equipment. The resistance of the phenolic resins to acids has permitted the use of the articles in commercial chemical equipment handling acids such as tanks, towers, pipes, fume ducts, valves, and many other items.

The use of furfuryl alcohol resins in such a procedure offers great advantages as compared to phenolic resins, since furfuryl alcohol resins possess especially advantageous characteristics; for example their physical properties such as shock resistance, when substantially cured, are considerably better than are obtained with phenolic resins and their chemical resistance is not only superior to that of phenolic resins but is far more extensive. For instance, the phenolic resins are not resistant to caustic alkalis and their resistance to organic solvents is limited; acetone for example, attacking most phenolic resins very badly. The furfuryl alcohol resins however, are resistant to both acids and bases, including caustic alkalies, and they are not affected by the usual organic solvents. Due to these properties, furfuryl alcohol resins not only offer advantages when used in the above-outlined procedure, but in addition will provide products of very desirable characteristics when molded by other methods, for example in a compression mold using hydraulic pressure.

One object of the present invention is to provide a process by which an initial furfuryl alcohol resinous composition may be converted into a final insoluble and infusible product without encountering the difficulties heretofore presented.

Another object of the invention is to provide a process for the production of substantially converted furfuryl alcohol resinous products by which large as well as small articles of optimum physical properties may be obtained.

Still another object of the present invention is to provide a process for the conversion of an article formed from an initial furfuryl alcohol resinous composition into the heat-hardened insoluble, infusible state in an easily controlled manner and without danger of blistering or cracking the article during the heat-treatment.

A further object of the invention is to provide a process by which the time required in the conversion of an article formed of a furfuryl alcohol resinous composition is materially reduced.

Other objects will be apparent from a consideration of this specification and the claims.

In the drawing, Figs. 1 and 2 illustrate typical heating cycles of the process of the invention.

In accordance with the process of the present invention, the initial furfuryl alcohol resinous composition is at least substantially converted into the heat hardened, insoluble, infusible resinous product by the use of a plurality of latent catalysts of definite but different threshold temperatures and by controlling the external heat supplied during the conversion so that the catalysts become effective successively.

Each latent catalyst employed is a compound which is ineffective at room temperature to cause significant reaction in the resin but which, in the presence of the resin and as the temperature of the resinous composition is raised by the application of external heat, becomes effective at a predetermined temperature (the threshold temperature) to promote condensation and polymerization of the resin with accompanying liberation of exothermic heat and which, so long as the temperature of the external heating medium does not fall substantially below the threshold temperature but independent of further stimulus by the external heat, will spontaneously exert at least the major portion of its potential catalytic effect. A catalyst of this type is to be contrasted with a catalyst which slowly releases acid under the influence of heat and whose continued activity is dependent upon a continual supply of external heat.

Each of the latent catalysts will be mixed with the resin in an amount to cause the liberation of sufficient exothermic heat to raise the temperature of the resinous composition substantially above that of the external heating medium as the result of the activity of the catalyst. The amount of each catalyst with a threshold temperature below that of the catalyst with the highest threshold temperature will be insufficient in itself to convert the resin as the result of the heat treatment; in other words, on heating the mixture of resin and latent catalysts to each threshold temperature, the amount of catalyst having that threshold temperature will be insufficient to cause substantially complete conversion of the resin. The total amount of all the catalysts will however, be sufficient to provide at least a substantially complete conversion of the resin. Generally the total amount of latent catalysts employed is between about 2% and 10%, and preferably between about 3% and 6%. Usually each latent catalyst is present in an amount not less than about 1%. Since at the time the catalyst with the highest threshold temperature becomes active, the resin will be partially converted and therefore relatively inactive as compared to the initial resin, the amount of latent catalyst having the highest threshold temperature over the minimum required is relatively immaterial and this catalyst may be present in an amount to shorten the time of conversion and may even be present in a sufficient quantity which, if used by itself, would have caused substantially complete conversion of the resin.

The catalysts are added to and mixed with the initial furfuryl alcohol resinous composition before it is formed into the desired shape and the formed product is subjected to a heat treatment to cause the latent catalysts to become effective successively and to convert the resin into the substantially completely converted insoluble, infusible product. Advantageously, the heat treatment is conducted under pressure, and in the preferred embodiment, gaseous pressure and a heated gas serving as the external heating medium, are employed.

In the heating cycle, external heat is supplied to the composition to raise the temperature thereof gradually to cause each of the latent catalysts to become active as the threshold temperature thereof is reached. During the heating, the supply of external heat is controlled so that the threshold temperature of the catalyst with the next highest threshold temperature is not reached until the liberation of exothermic heat caused by the action of the catalyst with the next lower threshold temperature has at least reached its maximum. The heating of the composition is continued until the required conversion temperature is reached and until a substantially completely converted insoluble, infusible product is obtained. As stated, each catalyst is used in an amount so that as a result of its activity, it causes liberation of sufficient exothermic heat to raise the temperature of the resinous product substantially above the temperature of the external heating medium and at these times in the heating cycle, the external heating medium in reality becomes a mild cooling medium and this further aids in controlling the reaction.

In the preferred embodiment in which the length of time of the heat-treatment is a minimum, the rise in temperature of the heating medium is controlled so that the action of the catalyst with the next higher threshold temperature becomes effective after the action of the preceding catalyst has reached its maximum but before it has subsided substantially, that is—before there has been an appreciable temperature drop in the resinous composition. In this way, full advantage is taken of the exothermic heat generated by the first catalyst and thus a substantial temperature drop in the article may be avoided and the maximum safe rate of reaction is attained. If desired, however, the rise in temperature of the heating medium may be restricted so that the action of the catalyst with the next higher threshold temperature does not occur until the exothermic heat liberated by the action of the preceding catalyst has ceased or substantially ceased. In this case, while the final product will have the desired properties and will be free from blisters and cracks, the length of time of the heat-treatment is extended somewhat to make up for the temperature drop.

The initial furfuryl alcohol resin to which the latent catalysts are added may be prepared by any desired method and may be any initial resin which is of insufficient acidity, for example of a pH above about 3 and preferably between 5 to 7, to be convertible during the utilization thereof in the formation and shaping of products. As pointed out above, the initial resin may be prepared by the condensation of furfuryl alcohol or of a mixture of furfuryl alcohol and not more than about 15% furfural. If the initial resin following its preparation has a sufficiently high acidity so that it possesses a tendency for spontaneous conversion, the acidity may be reduced to the point required for stability at room or other low temperature by removal of the excess acid therefrom. The removal of the excess acid is advantageously accomplished by neutralization but if desired, the initial resin may be washed with water until the acidity has been reduced to the desired point. While an alkaline initial resin may be used to form the shaped articles, the use thereof is not recommended in view of the fact that a portion of the catalytic material may be inactivated by the free alkali present.

The initial furfuryl alcohol resin is advantageously substantially anhydrous (less than about 2% water) but if desired, the resin may contain water up to the amount that is compatible with the resin. The degree of condensation of the initial resin, as indicated for instance by its viscosity, may vary as desired. Usually, the viscosity of the initial resin in centipoises at 77° F. will be between 25,000 and 4,000,000 and advantageously the viscosity will be between 50,000 and 2,500,000 and preferably between 50,000 and 300,000. If the resin is found to act as a thixotropic gel at 77° F. then this condition is destroyed by agitation before measuring the viscosity.

As hereinabove stated, there is mixed with the furfuryl alcohol initial resin a plurality of catalysts of different threshold temperatures; in other words, two or more compounds which at different temperatures act to catalyze the further condensation and polymerization of the resin. The latent catalysts may be either organic or inorganic and, while they are incapable at room temperature of serving as effective catalysts, they exercise an abrupt catalytic action in an effective amount, possibly through the liberation of acid, at a threshold temperature to cause additional condensation and polymerization of the resin at an accelerated rate.

There are many examples of latent catalysts available for use in the process of the present invention and the particular catalysts employed in any particular case may be selected from a wide variety of materials. As stated, at least two latent catalysts with different threshold temperatures are employed and in the preferred embodiment of the process, three latent catalysts with different threshold temperatures are used. Four or more of such catalysts may be used if desired. The threshold temperatures of the catalysts advantageously differ from each other by at least about 10° F. and generally are at least about 15° F. and preferably at least 20° F. apart. It is to be understood that if desired, two catalysts may be employed with substantially the same threshold temperature, in which case they will be considered as a single catalyst, and in this instance, one or more catalysts with a higher or lower threshold temperature will also be employed. As stated previously, each catalyst will be insufficient by itself (except if desired, the catalyst with the highest threshold temperature) to convert the resin into the final insoluble, infusible state by the prescribed heat treatment, but the total amount of catalytic material present will bring about the desired substantially complete conversion. The catalyst with the highest threshold temperature may have a threshold temperature at or below the curing temperature of the resin, which in most instances will be between 275° F. and 300° F. Obviously, the curing temperature of the resin will be below that temperature at which decomposition of the resin begins to occur.

The threshold temperature, defined as the temperature at which the compound provides a marked acceleration in the polymerization and condensation of the resin as is indicated by the rapid release of exothermic heat, will of course vary for the various compounds and will depend to some extent on the amount employed and on the environment in which it is used. The applicability of any particular compound as a catalyst in the process of the present invention and the threshold temperature thereof may be readily determined by using the following simple procedure: 40 grams of the resin to be converted are mixed with a weighed portion of the compound, for example 2 grams (5% of compound on the basis of the resin) which may be dissolved in a small amount of water or other solvent; this mixture is placed in a test tube provided with a thermometer extending into the mixture; the test tube is clamped into an oil bath, which is also provided with a thermometer; the temperature of the bath is then raised slowly, for instance at the rate of 1° F. per minute, preferably with constant agitation; if the compound is applicable for use as a latent catalyst in accordance with the process of the invention, a point will be reached in the heating at which the temperature of the material in the test tube will start to exceed the temperature of the bath (the threshold temperature) and will continue to rise substantially thereabove, and after a period of time, usually at least fifteen minutes after the threshold temperature is reached, the temperature of the material will again coincide with the bath temperature. This shows that the catalyst, independent of further stimulus by the external heat, is spontaneously exerting at least the major portion of its potential catalytic effect. If, on the other hand, by this gradual heating, a bath temperature corresponding to the curing temperature normally employed—i. e. between about 275° F. and 300° F. is finally reached without encountering the conditions described above, the compound is inapplicable for use. One skilled in the art may therefore, readily determine whether a particular compound which is thought to be applicable for use will in fact serve satisfactorily to catalyze the conversion of the initial furfuryl alcohol resin. For example, the catalysts may be selected from the following types of compounds:

The aromatic sulphonchlorides such as benzene sulphonchloride, paratoluene sulphonchloride, paraacetyl benzene sulphonchloride; the aliphatic amino salts of the aromatic sulphonic acids, including the ammonium salts such as ammonium paratoluene sulphonate, dimethyl amino benzene sulphonate, diethyl amino toluene sulphonate, ammonium benzene sulphonate and disulphonate, ammonium phenol sulphonate, ammonium naphthalene sulphonate and disulphonate, ammonium anthracene sulphonate and disulphonate, ammonium sulphanilate; the aromatic amino salts of aromatic sulphonic acids such as the aniline salt of benzene sulphonic acid, the aniline salt of paratoluene sulphonic acid, and the pyridine salt of phenol sulphonic acid; the organic salts of strong inorganic acids such as glyoxal sulphate; the metallic salts of chlorsulphonic acid such as sodium chlorsulphonate and potassium chlorsulphonate; the aliphatic and aromatic salts of strong inorganic acids such as triethanolamine chloride, aniline hydrochloride, ammonium sulphamate, pyridine sulphate, pyridine bisulphate, and aniline sulphate; the amino salts of sulphanilic acid such as aniline sulphanilate and pyridine sulphanilate; the chlorinated aromatic compounds such as trichlorbenzene; acid anhydrides such as phosphoric anhydride and maleic anhydride; the ammonium salts of alkane sulphonic acids such as ammonium ethane sulphonate; the ferric salts of sulphonic acids such as ferric benzene sulphonate and ferric toluene sulphonate; the ammonium salts of organic substituted inorganic acids such as ammonium ethyl phosphate; and inorganic compounds such as ferric chloride, stannic chloride, and sodium bisulphate.

The threshold temperatures of certain of the latent catalysts, determined as above described when the latent catalyst was mixed with a substantially anhydrous (less than 2% water) furfuryl alcohol initial resin having a pH value about 5, the viscosity of the resin and the amount of catalyst used being set forth in the following table, are:

| Latent Catalyst | Amount in percent | Viscosity of Initial Resin in Centipoises at 77° F. | Threshold Temperature, Degrees F. |
|---|---|---|---|
| Phosphoric anhydride | 5 | 100,000 | 126 |
| P-toluene sulphonchloride | 2 | 50,000 | 126 |
| Aniline hydrochloride | 5 | 100,000 | 140 |
| Benzene sulphonchloride | 5 | 100,000 | 145 |
| Stannic chloride | 5 | 180,000 | 145 |
| Ammonium benzene sulphonate | 5 | 100,000 | 148 |
| Ferric chloride | 5 | 100,000 | 154 |
| Maleic anhydride | 5 | 180,000 | 154 |
| Ammonium p-toluene sulphonate | 5 | 180,000 | 160 |
| Ammonium phenol sulphonate | 5 | 100,000 | 165 |
| Ferric benzene sulphonate | 5 | 100,000 | 167 |
| Ammonium ethane sulphonate | 5 | 100,000 | 184 |
| Sodium bisulphate | 5 | 180,000 | 203 |
| Pyridine bisulphate | 5 | 100,000 | 207 |
| Pyridine sulphate | 5 | 100,000 | 212 |
| Ammonium ethyl phosphate | 5 | 100,000 | 221 |

In the curing of the resinous composition, sufficient external heat is supplied thereto usually at a gradually increasing rate to heat the composition to the threshold temperature of the catalyst with the lowest threshold temperature. The catalyst then becomes effective and sufficient exothermic heat is liberated to raise the temperature of the composition substantially above that of the external heating medium. The temperature of the heating medium is raised gradually and usually at an ever-increasing rate so that the temperature of the resinous composition, as the result of the exothermic heat liberated and the effect of the external heating medium, will reach the threshold temperature of the catalyst with the next higher threshold temperature after the liberation of the exothermic heat caused by the action of the preceding catalyst has reached its maximum. Preferably the temperature of the resinous composition is not permitted to drop substantially; that is to say—in the preferred embodiment, the second catalyst is caused to become active before the exothermic heat liberated by the action of the first catalyst, has subsided substantially. If more than two catalysts have been mixed with the resin, then the temperature rise of the external heating medium is continued usually at an increasing rate as described above, to insure that the remaining catalyst or catalysts become effective in a manner and under the conditions described. The exothermic heat liberated by the latent catalysts cooperating with the gradual and usually accelerating temperature rise of the external heating medium, is relied upon to bring the temperature of the resinous composition to the curing or conversion temperature, usually about 275° F. to 300° F., and the composition is maintained at the conversion temperature by the external heating medium until it is at least substantially completely converted into the insoluble, infusible product. The overall time cycle generally requires from 8 to 20 hours, but usually requires from 10 to 16 hours. A substantially completely converted resinous product is one which gives an acetone extraction of not more than 15% based on the weight of the resin in the composition, as determined by A. S. T. M. D494-41. Advantageously, the conversion is carried to the point where the product has an acetone extraction of less than 10% and preferably less than 5%.

In order that the above description of the process may be illustrated, the accompanying drawings—Figs. 1 and 2, show typical heating cycles of a process in which three latent catalysts are mixed with a substantially anhydrous furfuryl alcohol resin, Fig. 2 showing the preferred embodiment. In Fig. 1, the relative positions of the threshold temperatures of the three latent catalysts are shown as $T.T._1$, $T.T._2$, and $T.T._3$ respectively. The dotted line, representing the temperature of the external heating medium and the full line, representing the temperature of the resinous composition, show the slight lag in heating the composition to the first threshold temperature, $T.T._1$. When the temperature of the composition reaches the $T.T._1$, the catalyst with that threshold temperature becomes effective, causing the liberation of exothermic heat, resulting in the temperature of the composition rising substantially above the temperature of the heating medium. However, due to the mild cooling effect of the surrounding heating medium, the temperature of the composition does not reach $T.T._2$. After the activity of the latent catalyst with the lowest threshold temperature has passed its maximum and due to the cooling effect of the external heating medium, the temperature of the resinous composition subsides, approaching the temperature of the heating medium. Since the temperature of the heating medium is gradually rising, and since the temperature of the resinous composition is relatively rapidly decreasing, the temperature of the former overtakes and slightly exceeds that of the latter. At this point the heating medium is supplying heat to the resinous composition, raising its temperature to $T.T._2$. At $T.T._2$, the latent catalyst with that threshold temperature becomes effective, causing an exothermic reaction, resulting in the substantial increase of the temperature of the composition over that of the external heating medium. The temperature of the composition rises above that of the heating medium to a second maximum point relative to the heating medium. As the rate of exothermicity declines, the temperature of the external heating medium (now rising at a more rapid rate) again overtakes and exceeds the temperature of the composition until the temperature of the composition has been heated to T.T.₃. At T.T.₃ the composition again reacts exothermally, causing the third maximum temperature point relative to the temperature of the heating medium. This third peak subsides during the curing cycle and the temperature of the resinous composition approaches that of the external heating medium and is maintained at the temperature of the external heating medium until at least substantially complete conversion is attained. It will be noted that the temperature of the external heating medium is raised gradually but at an ever-increasing rate, until the curing temperature is reached. This is due to the fact that as the reaction proceeds, the reactivity of the resinous composition steadily diminishes, allowing increasingly greater heat stimulation.

In Fig. 2 (the preferred embodiment) the time of the heating cycle is decreased, allowing a fuller advantage of the plurality of latent catalysts to be obtained. As in the case of Fig. 1, when the temperature of the composition reaches T.T.₁, it rises above the temperature of the external heating medium due to the exothermic reaction. The temperature of the external heating medium is raised at a more rapid rate than was the case in Fig. 1 and thus the rate of heat transfer from the composition to the surroundings, is not as great as in the previous case. Thus at no time is there any substantial temperature drop in the composition and the combination of the exothermic heat liberated and the rise in temperature of the external heating medium, brings the temperature of the composition to T.T.₂. At T.T.₂, the latent catalyst with that threshold temperature becomes effective, causing an accelerated increase in the temperature of the composition. The temperature of the heating medium is still being increased relatively rapidly, preventing cooling to the extent encountered in Fig. 1 and thus, without any substantial temperature drop in the composition, the combination of the exothermic heat liberated and the rapid temperature rise of the external heating medium brings the temperature of the composition to T.T.₃ and a third maximum point relative to the temperature of the external heating medium. This maximum point gradually subsides during the curing cycle and approaches the temperature of the external heating medium. It will be understood that if care is taken, the rate of temperature rise of the external heating medium may be even more rapid causing the full line, representing the temperature of the composition, to proceed from T.T.₁, through T.T.₂ to T.T.₃ in a relatively uniform curve not characterized by the waves or peaks shown in Figs. 1 and 2.

The external heat may be supplied by the use of heated air or other gas in the case the formed article is being cured in an oven or autoclave or it may be supplied by a mold surface or platen if the molding is being performed in a pressure mold. The process is particularly applicable for the conversion of articles in an oven or autoclave and the conversion may be brought about at atmospheric pressure if desired. In most instances however, the autoclave will be maintained under a pressure of from about 5 to 40 atmospheres, generally from 5 to 15 atmospheres.

The initial resin containing the plurality of catalysts may be utilized, with or without a filling material, in the manner well known in the art—for example, it may be used in the preparation of a molding mixture; in the preparation of a pasty composition for molding in accordance with the process described in "Chemistry of Synthetic Resins" by Ellis (supra); or in the preparation of a cement; or in the preparation of a solution or varnish and the coating or impregnation of materials therewith. Examples of fillers are fibred or sheet asbestos, glass fibres, cotton duck, graphite, slate dust, quartz, wood flour, and the like.

The results obtained by the process of the present invention are to be contrasted with those obtained when a single catalyst is used. In the process of the invention, the heating is controlled so that the exothermic heat is not liberated simultaneously by the two or more of the catalysts, and in this way an uncontrollable reaction and the cracking and blistering of the product are avoided. Furthermore, the time cycle can be materially shortened by the process herein described, as compared to a process in which a single catalyst is relied upon, due to the fact that the rate of heating in the process of the present invention may be increased without danger of encountering an uncontrollable reaction. For example, in a typical process using a single catalyst, the time cycle is 30 hours, whereas in the process of the invention, the time cycle may be reduced to 16 hours or less. The present invention provides a process by which both large and small objects of uniform physical properties, free from stresses, cracks and blisters, may be substantially fully converted with safety and in a relatively short time.

The following examples illustrate further the invention:

Example I 100 grams of a neutral furfuryl alcohol resin with a viscosity of approximately 130,000 centipoises at 77° F. are mixed with 2 grams of paratoluene sulfonchloride (threshold temperature about 126° F.), 2 grams of ferric chloride (threshold temperature about 154° F.), and 2 grams of pyridine bisulfate (threshold temperature about 207° F.).

The resulting mixture is cast into a glass mold of the desired shape and heated in a salt water bath at the rate of 2° F. per minute for the first 20 minutes until the temperature of the heating medium has reached 121° F. The rate is then slowed to 1° F. per minute. After a further 15 minutes, at a bath temperature of about 135° F., an exothermic reaction starts which is caused by the paratoluene sulfonchloride passing its threshold temperature.

This causes a rise of 8° F. above the bath temperature at the rate of 2° F. every 5 minutes for 15 minutes when the rate slows down to 1° F. in 5 minutes, indicating that the paratoluene sulfonchloride has exhausted most of its energy. At this point the threshold temperature of the ferric chloride has been reached and this causes the temperature of the material to rise at the rate of about 3½° F. every 5 minutes until a maximum of 17° F. above the bath temperature is reached after a total heating time of 65 minutes.

The exothermic heat now subsides gradually to zero at a bath temperature of 202° F. after 100 minutes.

Although the material by this time is practically hard, a slight exothermic reaction starts again after 125 minutes caused by the pyridine bisulfate with a threshold temperature of 207° F. This final reaction with a peak of only 3° F. subsides slowly until the temperature of the material follows the bath temperature.

When this point is reached, the mass is brought into an oven, where the temperature is gradually raised to about 275° F. and maintained there for from 10 to 12 hours. The mixture is thereby transformed into a dark, uniform product, showing the exact contours of the mold.

*Example II*

2300 grams of a neutral furfuryl alcohol resin with a viscosity of 200,000 centiposes at 77° F. are mixed in a dough-type mixer with 2300 grams of asbestos fibres which are free from acid soluble impurities, 34.5 grams of paratoluene sulfonchloride (threshold temperature about 126° F.), 69 grams of ferricbenzene sulfonate (threshold temperature about 167° F.), and 46 grams of pyridine bisulfate (threshold temperature about 207° F.). The mixture is then tamped into a cylindrical steel mold of about 7.5" in diameter and 3" in height and put into an autoclave under 105 to 110 pounds of air pressure (gauge). The air in the autoclave is then heated with the aid of steam coils or the like, at a rate approximately as follows:

|  | °F. |
|---|---|
| Starting temperature | 60 |
| 2 hours | 130 |
| 4 hours | 135 |
| 6 hours | 145 |
| 8 hours | 195 |
| 9 to 14 hours | 275 |

When the autoclave is opened after having cooled down to room temperature, the material in the mold is converted into a solid block of homogeneous structure without any blisters or cracks. An acetone extraction test (A. S. T. M. D494-41) gives a value of 3.7% which indicates a substantially complete conversion of the resin.

A thermocouple embedded in the center of the block during the heating period, shows the beginning of the exothermic reaction caused by the first catalyst after 100 minutes when the air temperature is about 135° F. The exothermic curve continues at between 6° and 15° F. above the air temperature for about 6 hours, indicating that the action of the second catalyst started before the activity of the first one had completely subsided. After a total of 400 minutes from the beginning of the heating, a new reaction started giving a peak temperature of 80° F. above the air temperature 85 minutes thereafter. This reaction is due to the activity of the pyridine bisulfate. The activity of all the catalysts is exhausted after about 720 minutes or 12 hours.

Considerable modification is possible in the selection of the latent catalysts and in the amounts employed, as well as in the heat cycle, without departing from the essential features of the invention.

I claim:

1. The method for the preparation of an insoluble, infusible resinous furane product from an initial resinous composition selected from the group consisting of the initial condensation product of furfuryl alcohol and of mixtures of furfuryl alcohol and not more than about 15% of furfural which comprises mixing, with an initial resinous composition selected from said group and of insufficient acidity to be convertible during the utilization thereof in the formation of products, a plurality of latent catalysts which are ineffective at room temperature to cause significant reaction in the resin but which, in the presence of said resinous composition and as the temperature thereof is raised by the application of external heat, become effective at definite but different threshold temperatures to promote condensation and polymerization of the resin with the accompanying liberation of exothermic heat and each of which, so long as the temperature of the external heating medium does not fall substantially below the threshold temperature for that catalyst but independent of further stimulus by the external heat, will spontaneously exert at least the major portion of its potential catalytic effect, each of said catalysts being mixed with said resin in an amount to cause the liberation of sufficient exothermic heat to raise the temperature of the resinous composition substantially above that of the external heating medium as the result of the activity of the said catalyst, each of said catalysts with a threshold temperature below that of the catalyst with the highest threshold temperature, being mixed with said resin in an amount insufficient to provide a substantially complete conversion of the resin but the total amount of the latent catalysts mixed with said resin being sufficient to bring about said conversion, and said catalysts having threshold temperatures at least 10° F. apart said catalyst with the highest threshold temperature having a threshold temperature no greater than the curing temperature of said resinous composition; supplying external heat to said composition to raise the temperature thereof gradually to cause each of said catalysts to become active as the threshold temperature thereof is reached; during said heating, controlling the supply of external heat so that the threshold temperature of the catalyst with the next higher threshold temperature is not reached until the liberation of exothermic heat caused by the action of the catalyst with the next lower threshold temperature has at least reached its maximum; and continuing the heating of the resinous composition until it is substantially completely converted into the insoluble, infusible state.

2. The process of claim 1, wherein the supply of external heat is controlled so that the threshold temperature of the catalyst with the next higher threshold temperature is reached before there has been an appreciable temperature drop in the resinous composition.

3. The process of claim 1, wherein the initial resin is substantially anhydrous; and wherein the resinous composition during the heating thereof is subjected to pressure.

4. The process of claim 1, wherein the initial resin is substantially anhydrous; wherein at least three latent catalysts are mixed with the initial resin; wherein the latent catalysts have threshold temperatures at least 15° F. apart; wherein the resinous composition is subjected to gaseous pressure during the heating thereof; and wherein the external heat is supplied by heated gas.

5. The process of claim 1, wherein the initial resin is substantially anhydrous; wherein the resinous composition is subjected to gaseous pressure during the heating thereof; wherein the external heat is supplied by heated gas; and wherein the supply of external heat is controlled so that the threshold temperature of the catalyst with the next higher theshold temperature is reached before there has been an appreciable temperature drop in the resinous composition.

6. The process of claim 1, wherein the initial resin is substantially anhydrous; wherein at least three latent catalysts are mixed with the initial resin; wherein the latent catalysts have threshold temperatures at least 20° F. apart; wherein the resinous composition is subjected to gaseous pressure during the heating thereof; wherein the external heat is supplied by heated gas; and wherein the supply of external heat is controlled so that the threshold temperature of the catalyst with the next higher threshold temperature is reached before there has been an appreciable temperature drop in the resinous composition.

PURNAL L. McWHORTER.

REFERENCES CITED

The following references are of record in the file of this patent:

UNITED STATES PATENTS

| Number | Name | Date |
| --- | --- | --- |
| 2,345,966 | Fiedler | Apr. 4, 1944 |
| 2,383,790 | Harvey | Aug. 28, 1945 |
| 2,383,793 | Harvey | Aug. 28, 1945 |
| 2,399,055 | Nordlander | Apr. 23, 1946 |
| 2,416,038 | Adams | Feb. 18, 1947 |